United States Patent
Ishikawa

(10) Patent No.: US 11,945,453 B2
(45) Date of Patent: Apr. 2, 2024

(54) ONBOARD DEVICE, INFORMATION GENERATING METHOD, NON-TRANSITORY STORAGE MEDIUM, AND VEHICLE

(71) Applicant: TOYOTA JIDOSHA KABUSHIKI KAISHA, Toyota (JP)

(72) Inventor: Tomoyasu Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/411,866

(22) Filed: Aug. 25, 2021

(65) Prior Publication Data
US 2022/0063646 A1 Mar. 3, 2022

(30) Foreign Application Priority Data
Aug. 31, 2020 (JP) .................. 2020-146261

(51) Int. Cl.
*B60W 50/06* (2006.01)
*G07C 5/00* (2006.01)

(52) U.S. Cl.
CPC ............. *B60W 50/06* (2013.01); *G07C 5/008* (2013.01)

(58) Field of Classification Search
CPC ............................... B60W 50/06; G07C 5/008
See application file for complete search history.

(56) References Cited

U.S. PATENT DOCUMENTS

| | | | |
|---|---|---|---|
| 2015/0051819 A1 | 2/2015 | Ellis et al. | |
| 2015/0309784 A1* | 10/2015 | Molin | F01N 9/002 701/1 |
| 2016/0098266 A1* | 4/2016 | Martin | G06F 8/654 717/171 |
| 2018/0018160 A1* | 1/2018 | Teraoka | G06F 8/65 |
| 2019/0155594 A1* | 5/2019 | Nakaguma | G06F 9/445 |
| 2019/0193653 A1* | 6/2019 | Nakamura | G06F 9/4893 |
| 2019/0250900 A1* | 8/2019 | Troia | G06F 8/65 |
| 2020/0183674 A1* | 6/2020 | Tateishi | G06F 8/65 |
| 2020/0272450 A1* | 8/2020 | Inoue | B60L 53/66 |

(Continued)

FOREIGN PATENT DOCUMENTS

| EP | 3 447 971 A1 | 2/2019 |
|---|---|---|
| JP | 2011-148398 A | 8/2011 |

(Continued)

OTHER PUBLICATIONS

Izumi, Tatsuya; English Translation of JP2017204227A; 2017; Espacenet (Year: 2017).*

*Primary Examiner* — Yazan A Soofi
*Assistant Examiner* — Naeem Taslim Alam
(74) *Attorney, Agent, or Firm* — Oliff PLC

(57) ABSTRACT

An onboard device configured to communicate with one or more other onboard devices in an onboard network, and configured to execute processing for updating of software of an own device while communicating with the other onboard devices, the onboard device includes an electronic control unit. The electronic control unit is configured to generate, when not performing the processing, information to transmit to the other onboard devices by executing the software, as first information, and generate, when performing the processing, information to transmit to the other onboard devices without executing the software, as second information.

8 Claims, 3 Drawing Sheets

(56) References Cited

U.S. PATENT DOCUMENTS

| | | | | |
|---|---|---|---|---|
| 2021/0051000 A1* | 2/2021 | Yang | .......................... | H04L 9/08 |
| 2021/0141631 A1* | 5/2021 | Harata | .................. | G06F 21/572 |
| 2022/0156057 A1* | 5/2022 | Kobayashi | ................ | G06F 8/65 |
| 2022/0253300 A1* | 8/2022 | Yamada | ................ | B60W 50/06 |

FOREIGN PATENT DOCUMENTS

| | | | | |
|---|---|---|---|---|
| JP | 2015-051759 | A | | 3/2015 |
| JP | 2017-204227 | A | | 11/2017 |
| JP | 2017204227 | A | * | 11/2017 |
| JP | 2018-076040 | A | | 5/2018 |
| JP | 2020-023314 | A | | 2/2020 |

* cited by examiner

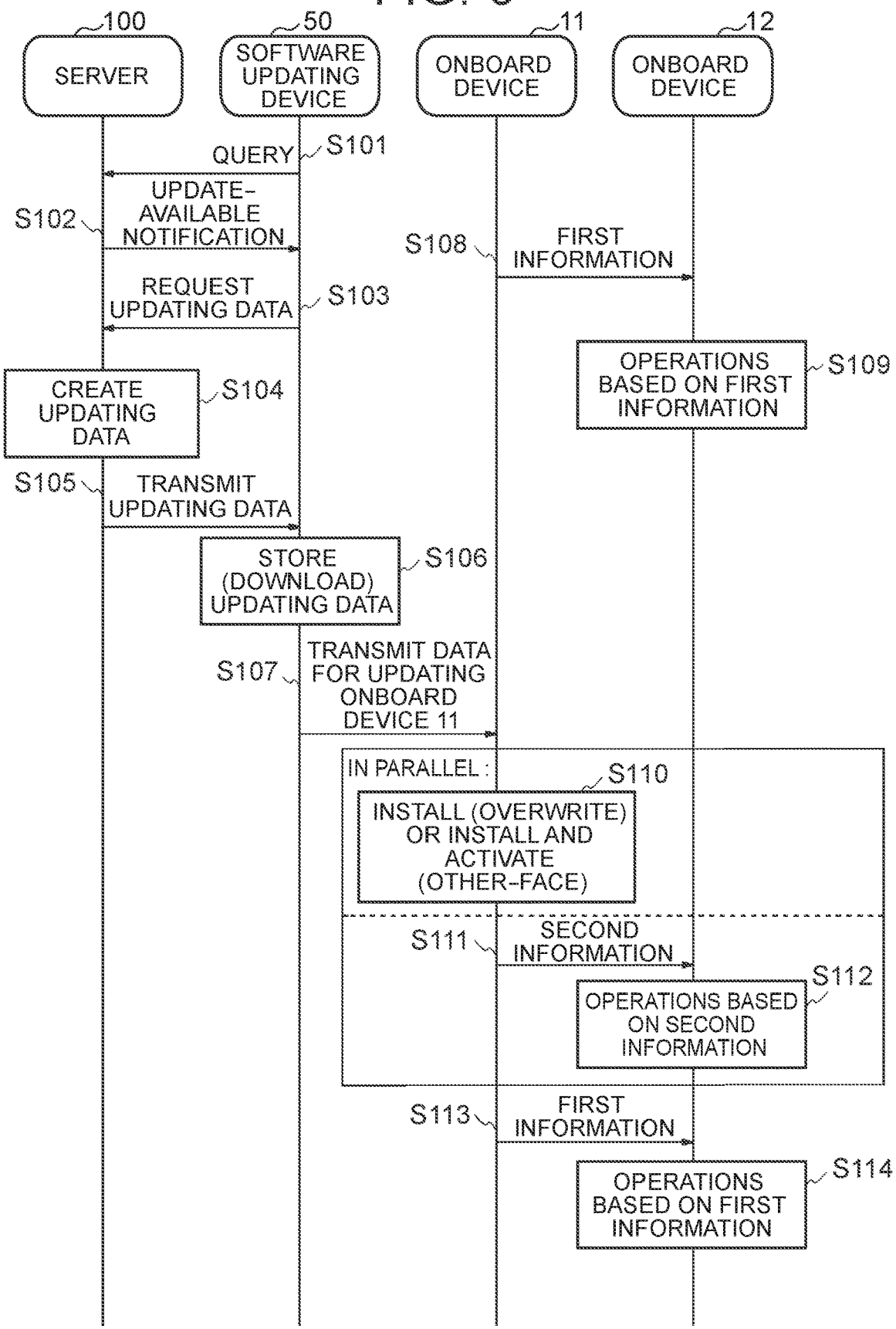

ONBOARD DEVICE, INFORMATION GENERATING METHOD, NON-TRANSITORY STORAGE MEDIUM, AND VEHICLE

CROSS-REFERENCE TO RELATED APPLICATION

This application claims priority to Japanese Patent Application No. 2020-146261 filed on Aug. 31, 2020, incorporated herein by reference in its entirety.

BACKGROUND

1. Technical Field

The present disclosure relates to an onboard device, an information generating method, a non-transitory storage medium, and a vehicle.

2. Description of Related Art

A network system, configured of a plurality of onboard devices called electronic control units (ECUs) connected to each other via communication lines, is installed in a vehicle. The onboard devices exchange messages with each other to respectively undertake various functions of the vehicle.

The onboard devices typically are provided with a processor, a transitory storage unit such as random access memory (RAM), and a nonvolatile storage unit such as flash read-only memory (ROM). Software (program) that the processor executes is stored in the nonvolatile storage unit. Updating the software by rewriting to a newer version enables functions of the onboard devices to be improved and enhanced.

Updating of software includes steps of downloading, in which updating data is received from a server (center) by wireless communication or the like, and installing, in which updating software is written to the storage units of the onboard devices based on the downloaded updating data. Installing includes overwrite installing and other-face installing. In the overwrite installing, downloaded updating software is overwritten over the current software (old software) in one region (one face) set as a region for software storage in a storage region of a storage unit in accordance with specifications of the onboard device. In the other-face installing, writing is performed to, out of two regions (two faces) set as regions for software storage, a region (other face) that is not a region in which the current software (old software) is stored (one face). The two regions set as regions for software storage may be regions each included in different banks (configuration increments) of the same memory part, or may each be regions of different memory parts, such as standard-equipment memory parts and expansion-equipment memory parts, for example.

When performing other-face installing, the step of software updating includes, in addition to the steps of downloading and installing, a step of activating, in which the installed updating software is enabled as software to be executed.

With regard to software updating of ECUs, Japanese Unexamined Patent Application Publication No. 2011-148398 discloses a particular ECU functioning as a master ECU, communicating with a server, and updating software of the master ECU itself and other ECUs.

SUMMARY

While updating software, such as while performing overwrite installation of software, or while activating other-face-installed software, for example, the onboard device thereof cannot be operated since the software cannot be executed, and functions of the vehicle may be restricted.

Accordingly, software updating may lead to impaired user convenience.

The present disclosure provides an onboard device that is capable of suppressing reduced convenience regarding software updating.

A first aspect of the present disclosure is an onboard device configured to communicate with one or other more onboard devices in an onboard network, and configured to execute processing for updating of software of an own device while communicating with the other onboard devices. The onboard device includes an electronic control unit. The electronic control unit is configured to generate, when not performing the processing, information to transmit to the other onboard devices by executing the software, as first information, and generate, when performing the processing, information to transmit to the other onboard devices without executing the software, as second information.

In the first aspect, the second information may be a predetermined control value used by the other onboard devices.

In the first aspect, the second information may be an operation request requesting the other onboard devices to operate in a predetermined operation mode.

In the first aspect, the second information may be software executed by the other onboard devices.

A second aspect of the present disclosure is an information generating method, executed by a computer of an onboard device configured to communicate with another onboard device in an onboard network, and configured to execute processing for updating of software of an own device while communicating with the other onboard device. The information generating method includes generating, when not performing the processing, information to transmit to the other onboard device by executing the software, as first information, and generating, when performing the processing, information to transmit to the other onboard device without executing the software, as second information.

A third aspect of the present disclosure is a non-transitory storage medium storing instructions, different from software of an own device, that are executable by one or more processors in a computer of an onboard device configured to communicate with one or more other onboard devices in an onboard network, and configured to execute processing for updating of the software of the own device while communicating with the other onboard devices, and that cause the one or more processors to execute functions. The functions include generating, when performing the processing, information to transmit to the other onboard devices.

A fourth aspect of the present disclosure is a vehicle including an onboard device. The onboard device is configured to communicate with one or more other onboard devices in an onboard network, execute processing for updating of software of an own device while communicating with the other onboard devices, generate, when not performing the processing, information to transmit to the other onboard devices by executing the software, as first information, and generate, when performing the processing, information to transmit to the other onboard devices without executing the software, as second information.

In the fourth aspect, the second information may be a predetermined control value used by the other onboard devices.

In the fourth aspect, the second information may be an operation request requesting the other onboard devices to operate in a predetermined operation mode.

In the fourth aspect, the second information may be software executed by the other onboard devices.

According to the first aspect, the second aspect, the third aspect, and the fourth aspect of the present disclosure, when an onboard device performs software updating, functions of other onboard devices can be kept from stopping, and reduction in convenience can be suppressed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a sequence diagram illustrating processing according to the embodiment.

DETAILED DESCRIPTION OF EMBODIMENTS

Embodiment

Configuration

Figure 1:
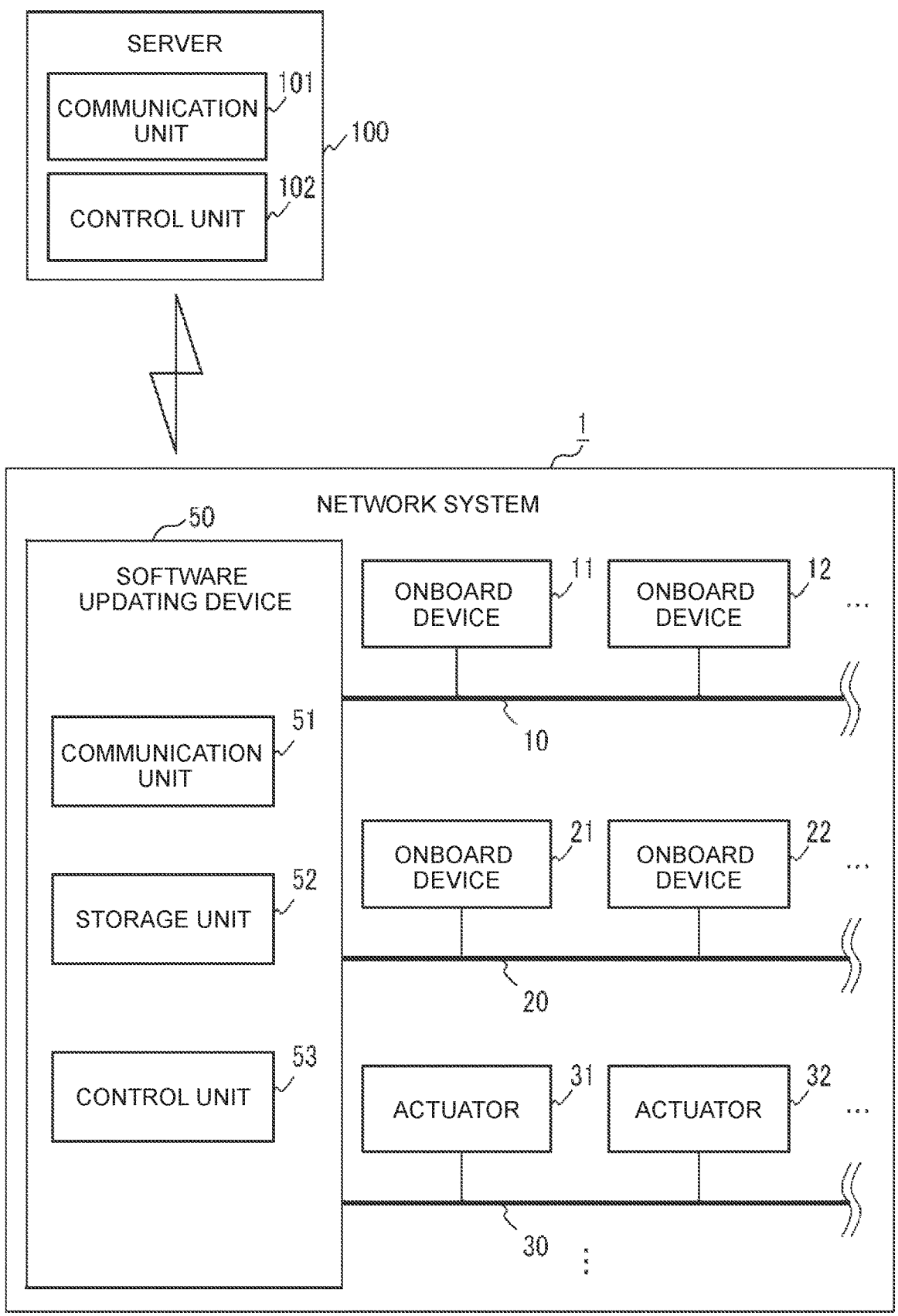
FIG. 1 is a configuration diagram of a network system according to an embodiment.

FIG. 1 illustrates a configuration example of a network system 1 according to an embodiment. The network system 1 is installed in a vehicle. The network system 1 includes a software updating device 50. A plurality of busses 10, 20, 30 . . . are connected to the software updating device (over-the-air (OTA) master) 50. A plurality of onboard devices (ECUs) 11, 12 . . . is connected to the bus 10. A plurality of onboard devices 21, 22 . . . is connected to the bus 20. A plurality of actuators 31, 32 . . . is connected to the bus 30. Although in FIG. 1 and the following description, the busses 10, 20, and 30 are exemplified as busses, and the onboard devices 11, 12, 21, and 22 and the actuators 31 and 32 are exemplified as onboard devices, these numbers are not limiting. Note that various types of sensors for acquiring the states of the vehicle and the surroundings of the vehicle are connected to the busses 10, 20, and 30, and the onboard devices 11, 12, 21, and 22 as appropriate.

The software updating device 50 includes a communication unit (communication module) 51 capable of communicating with a server (center, external device) 100 that is installed outside of the vehicle, a storage unit (storage) 52 that stores various types of data, and a control unit 53.

Figure 2:
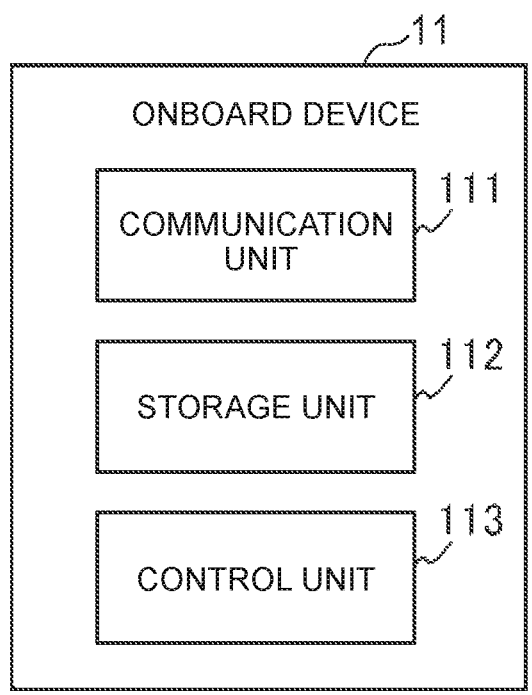
FIG. 2 is a configuration diagram of an onboard device according to the embodiment.

The onboard devices 11, 12, 21, and 22 communicate with each other via a network, and perform various types of processing for vehicle control. FIG. 2 illustrates a configuration example of the onboard device 11. The onboard device 11 includes a nonvolatile storage unit (storage) 112 such as flash ROM or the like, a control unit (processor, microcontroller) 113 that reads software out from the storage unit 112 and executes the software, thereby performing various types of processing, and a communication unit 111 that performs communication with other onboard devices and the software updating device 50. Although omitted from illustration, the onboard device 11 also includes a transitory storage unit such as RAM that stores part of software and data. The onboard devices 12, 21, and 22 are configured in the same way. Note that the software updating device 50 also stores software (program) for the software updating device 50 in the storage unit 52 in the same way, and is capable of executing the functions of the software updating device 50 by the control unit (processor, microcontroller) 53 reading out and executing the software. That is to say, the onboard devices 11, 12, 21, and 22 and the software updating device 50 can be implemented as computers including processors, microcontrollers, or the like.

Also, the control unit 53 of the software updating device 50 controls and relays communication between the server 100 and the onboard devices 11, 12, 21, and 22, communication among the onboard devices 11, 12, 21, and 22, and communication between the onboard devices 11, 12, 21, and 22, and the actuators 31 and 32, via the busses 10, 20, and 30. Thus, the software updating device 50 also functions as a relay device that relays communication. Alternatively, the software updating device 50 may be provided as a part of such a relay device, or may be provided by being connected to one of the busses 10, 20, and 30 separately from such a relay device.

The actuators 31 and 32 are onboard devices that generate mechanical actions with regard to the vehicle and a part thereof, such as brakes, engine, power steering, and so forth, for example, and operate under instructions from the onboard devices 11, 12, 21, and 22. The actuators 31 and 32 may also include a computer configured of a processor or a microcontroller, memory, and so forth.

The control unit 53 of the software updating device 50 is capable of updating software stored in the storage unit of each of the onboard devices 11, 12, 21, and 22. That is to say, the software updating device 50 performs control of downloading, control of installing, and further control of activating. Downloading is processing of receiving and storing updating data (distribution package) for updating software of one of the onboard devices 11, 12, 21, and 22 that has been transmitted from the server 100. Control of downloading is not limited to executing downloading alone, and may include a series of control of processing relating to downloading, such as determination regarding whether to execute downloading, verification of updating data, and so forth. Installing is processing of writing update-version software (updating software) in the second storage unit of the onboard device that is the object of updating, based on the downloaded updating data. Control of installing is not limited to executing installing alone, and may include control of a series of processing relating to installing, such as determination regarding whether to execute installing, transfer of updating data, verification of update-version software, and so forth. Activating is processing of performing configuration and so forth, such as setting a value of an execution start address of the software, for example, in order to enable the installed update-version software as software to be executed. Control of activating is not limited to executing activating alone, and may include a series of control relating to activating, such as determination regarding whether to execute activating, verification of execution results, and so forth.

In control of installing, the control unit 53 can transmit the updating software to the onboard device when the updating data includes the updating software itself. Also, when the updating data includes compressed data, difference data, or divided data of the updating software, the control unit 53 can perform unpacking, assembling, or the like, of the updating data, thereby generating the updating software, and transmit the updating software to the onboard device. Alternatively, the control unit 53 may transmit the updating data to the onboard device, and the onboard device may perform unpacking, assembling, or the like, of the updating data, and generate the updating software.

The control unit 53 may execute installation itself of writing the updating software to the second storage unit of the onboard device, the onboard device may perform this under instruction of the control unit 53, or the onboard device that has received the updating data (or the updating software) may autonomously perform this without explicit instruction of the control unit 53.

The control unit 53 may execute activation itself of enabling the installed updating software, the onboard device may perform this under instruction of the control unit 53, or the onboard device may autonomously perform this following installation, without explicit instruction of the control unit 53.

Note that such updating processing of software can be performed successively, or in parallel, to each of the onboard devices. Also note that updating data is data used for generating updating software, and includes, for example, the updating software itself, difference data for generating the updating software, compressed data or divided data thereof, or the like, as described above, and the content and the format thereof are not limited. The updating data may also include an identifier of the onboard device (ECU ID) that is the object of software updating (target ECU) and the identifier of the version of software prior to updating (WCU Software ID).

The server 100 is in one example a computer device, such as a server or the like installed in a particular center or the like, and is capable of transmitting respective updating data to each of a plurality of vehicles, for updating software of onboard devices of the vehicles. The server 100 includes a communication unit (communication module) 101 for communicating with the software updating device 50 and a control unit 102 for controlling the communication unit 101. The functions of the control unit 102 are executed by a processor, microcontroller, or the like. The server 100 is provided with a storage unit that is omitted from illustration, and is also capable of externally accepting and storing data for updating software for each of the onboard devices.

Processing

An example of software updating processing according to the present embodiment will be described below. FIG. 3 is a sequence diagram showing an example of this processing. This processing is started in a state in which the power of the vehicle is on (ignition on, power on), for example.

Step S101

The control unit 53 of the software updating device 50 controls the communication unit 51 to query the server 100 regarding whether there is updating software.

Step S102

Upon the communication unit 101 of the server 100 receiving the query, when there is updating software, the control unit 102 controls the communication unit 101 to transmit an update-available notification to the software updating device 50. The control unit 102 is capable of determining, based on information representing types of the onboard devices included in the network system 1 and current software versions, for example, whether there is updating software, which is an update version, of software for these onboard devices. The server 100 may store such information in advance, or may receive the information at the time of the query from the software updating device 50. Note that when there is no updating software, the control unit 102 controls the communication unit 101 to transmit an update-not-available notification to the software updating device 50.

Step S103

Upon the communication unit 51 of the software updating device 50 receiving an update-available notification, the control unit 53 displays a prompt on a human-machine interface (HMI) device, which is one of the onboard devices, for permission to download the updating data. When the user performs an operation for permission on the HMI device, the control unit 53 controls the communication unit 51 to make an updating data request to the server 100.

Step S104

Upon the communication unit 101 of the server 100 receiving the updating data request, the control unit 102 of the server 100 generates updating data to be transmitted to the vehicle, based on the updating software provided to the server 100. The updating data includes data for updating the software of one or more onboard devices (target ECUs) that are the object of software updating.

Step S105

The control unit 102 of the server 100 controls the communication unit 101 to transmit updating data.

Step S106

The communication unit 51 of the software updating device 50 receives the updating data, and the control unit 53 stores the updating data in the storage unit 52 (download).

Step S107

The control unit 53 of the software updating device 50 starts processing of installation, or installation and activation. As one example here, the onboard device 11 is included in the onboard devices that are the object of software updating, and the control unit 53 transmits, to the onboard device 11, data for updating the software of the onboard device 11. The data is included in the updating data received from the server 100.

Step S108

In parallel with the above-described steps S101 through S107, the control unit 113 of the onboard device 11 executes software stored in the storage unit 112 to generate first information, which is data to be transmitted to another onboard device, and controls the communication unit 111 to transmit the first information to the other onboard device. Although the onboard device 11 generates the first information as information for the onboard device 12 to use, and transmits the first information to the onboard device 12 in the example shown in FIG. 3, the onboard device 11 may generate the first information as information for another onboard device to use, and transmit the first information to the other onboard device. Also, the onboard device 11 may generate the first information as information for a plurality of other onboard devices to use, and transmit the first information to the onboard devices. Further, the onboard device 11 may generate mutually different information for each of the other onboard devices to use, as first information for the respective onboard devices, and transmit the first information to the respective onboard devices. The first information is information necessary for other onboard devices to execute the functions thereof, examples of which include various types of control values, requests, and so forth. The timing of transmitting the first information is not limited, and may be periodic, or may be only at times when particularly necessary. The first information is information that is calculated by highly-sophisticated processing by executing software, and is used for other onboard devices to carry out their functions well. Note that the term "onboard device" as used here can also include the above-described actuators 31 and 32 as well.

Step S109

In parallel with the above-described steps S101 through S107, the onboard device 12 receives the first information, and operates based on the first information.

Step S110

Upon receiving the data, the onboard device 11 updates the software based on the received data. That is to say, when the onboard device 11 is a type that performs overwrite installation, the onboard device 11 performs the above-described overwrite installation. Also, when the onboard device 11 is a type that performs the above-described other-face installing, the onboard device 11 performs the above-described other-face installing and activation, in that order. This processing may be performed with either the control unit 113 of the onboard device 11 or the control unit 53 of the software updating device 50 as the main entity, as described above.

Step S111

In parallel with step S110, the control unit 113 of the onboard device 11 generates second information without execution of software during overwrite installation processing or activation processing following other-face installing, and controls the communication unit 111 to transmit the second information to another onboard device. The second information is information that temporarily substitutes for the first information. The second information is, for example, predetermined values such as fixed values set as standard values for various types of control values, and can cause the functions of another onboard device to be carried out in at least a limited and temporary way, for example. Alternatively, the second information may be a request or the like requesting the other onboard device to operate in an operation mode in which functions are limited. Again, the second information may be software that the other onboard device executes. The other onboard device executes this software, so that the other onboard device can execute functions of the onboard device 11 generating the first information in at least a temporary or partial way. Thus, it is possible to avoid a situation that the functions completely stop. Note that when performing other-face installing, prior to activation processing, the control unit 113 can execute the pre-update software, and accordingly can generate the first information.

Step S112

In parallel with step S110, the onboard device 12 receives the second information, and operates in at least a temporary or partial way, based on the second information. Accordingly, the functions of the onboard device 12 do not completely stop even when the onboard device 11 is performing installation or activation processing.

Step S113

Upon the processing of overwrite installing or other-face installing and activation in the above-described step S110 ending, the control unit 113 of the onboard device 11 executes the updated software stored in the storage unit 112, generates the first information, and controls the communication unit 111 to transmit the first information to the other onboard device.

Step S114

The onboard device 12 receives the first information, and operates based on the first information. Thereafter, steps S113 and S114 are repeated as appropriate. This ends description of the sequence.

Although the above example is an example regarding when the updating data received from the server 100 includes data for updating software for the onboard device 11, updating of software of other onboard devices can be performed in the same way. Also, the number of onboard devices that are the object of updating is not limited, and updating of software for two or more onboard devices may be performed. Also, the data transmitted from the software updating device 50 to the onboard device in step S107 may substantively be the updating software itself, as described above, or may be compressed data thereof, or difference data as to the software before updating, or the like.

The other onboard device may be configured to transmit the first information and the second information in the same way as the above-described onboard device 11, and to perform the same processing. Accordingly, the onboard devices can reduce effects on each other from updating software, and suppress reduction in user convenience due to limitation of vehicle functions. As a matter of course, there may be cases in which ensuring safety of the vehicle by this method is difficult, depending on the type of onboard device performing software update, but in such cases, function restriction such as prohibition of driving or the like may be performed upon having notified the user and received permission from the user for example, and the software may be updated under the function restriction.

When the onboard device 11 stores two or more pieces of software in the storage unit 112 and updates the software that generates the first information, the onboard device 11 may generate the second information by executing the other software.

Also, updating of the software that generates the first information while the onboard device 11 stores two or more pieces of software in the storage unit 112 may be executed when other onboard devices are not operating and thus the other onboard devices are not readily affected, such as when the vehicle is stopped or the like. Updating of software that does not generate the first information while the onboard device 11 stores two or more pieces of software in the storage unit 112 may be executed at an optional timing, including when the vehicle is traveling. In this aspect, the second information does not need to be generated.

Advantages

In the present embodiment, when an onboard device is performing software updating, the second information is generated so that functions of other onboard devices can be kept from being completely stopped. Thus, it is possible to suppress convenience from being reduced.

The technology of the present disclosure can be understood as being an onboard device, a network system including the onboard device, a method executed by a computer provided to the onboard device, a program and a computer-readable non-transitory storage medium storing the program, a vehicle provided with the onboard device, and so forth.

The technology of the present disclosure is useful in a network system installed in a vehicle or the like.

What is claimed is:

1. An onboard device configured to communicate with one or more other onboard devices in an onboard network, and configured to execute processing for updating of software of an own device while communicating with the one or more other onboard devices, the onboard device comprising a processor programmed to:

determine whether or not processing for updating the software of the own device is in progress, generate, when not performing the processing, information to transmit to the one or more other onboard devices by executing the software, as first information, wherein the first information includes first control values that execute functions of the one or more other onboard devices, control an actuator, based on the first control values;

generate, when performing the processing, information to transmit to the one or more other onboard devices without executing the software, as second information, wherein the second information includes second control values that execute functions of the one or more other onboard devices; and control the actuator, based on the second control values, on at least a limited or temporary basis during the processing for updating the software, wherein the one or more other onboard devices each comprise a processor, and the second information is software executed by a processor of at least one of the one or more other onboard devices.

2. The onboard device according to claim 1, wherein the second information includes a predetermined control value used by the one or more other onboard devices.

3. The onboard device according to claim 1, wherein the second information includes an operation request requesting the one or more other onboard devices to operate in a predetermined operation mode.

4. An information generating method, executed by a computer of an onboard device configured to communicate with another onboard device in an onboard network, and configured to execute processing for updating of software of an own device while communicating with the other onboard device, the information generating method comprising:

determining whether or not a processing for updating the software of the own device is in progress;

generating, when not performing the processing, information to transmit to the other onboard device by executing the software, as first information, wherein the first information includes first control values that execute functions of the other onboard device;

controlling an actuator, based on the first control values;

generating, when performing the processing, information to transmit to the other onboard device without executing the software, as second information, wherein the second information includes second control values that execute functions of the other onboard device; and controlling the actuator, based on the second control values, on at least a limited or temporary basis during the processing for updating the software, wherein the other onboard device comprises a processor, and the second information is software executed by a processor of the other onboard device.

5. A non-transitory computer readable storage medium storing instructions, different from software of an own device, that are executable by one or more processors in a computer of an onboard device configured to communicate with one or more other onboard devices in an onboard network and configured to execute processing for updating of the software of the own device while communicating with the one or more other onboard devices, and that cause the one or more processors to execute functions comprising:

determining whether or not a processing for updating the software of the own device is in progress;

generating, when not performing the processing, information to transmit to the one or more other onboard devices by executing the software, as first information, wherein the first information includes first control values that execute functions of the one or more other onboard devices;

controlling an actuator, based on the first control values;

generating, when performing the processing, information to transmit to the one or more other onboard devices without executing the software, as second information, wherein the second information includes second control values that execute functions of the one or more other onboard devices; and controlling the actuator, based on the second control values, on at least a limited or temporary basis during the processing for updating the software, wherein the one or more other onboard devices each comprise a processor, and the second information is software executed by a processor of at least one of the one or more other onboard devices.

6. A vehicle comprising an onboard device configured to communicate with one or more other onboard devices in an onboard network and configured to execute processing for updating of software of an own device while communicating with the one or more other onboard devices, the onboard device comprising a processor programed to:

determine whether or not processing for updating the software of the own device is in progress;

generate, when not performing the processing, information to transmit to the one or more other onboard devices by executing the software, as first information, wherein the first information includes first control values that execute functions of the one or more other onboard devices;

control an actuator, based on the first control values;

generate, when performing the processing, information to transmit to the one or more other onboard devices without executing the software, as second information, wherein the second information includes second control values that execute functions of the one or more other onboard devices; and control the actuator, based on the second control values, on at least a limited or temporary basis during the processing for updating the software, wherein the one or more other onboard devices each comprise a processor, and the second information is software executed by a processor of at least one of the one or more other onboard devices.

7. The vehicle according to claim 6, wherein the second information includes a predetermined control value used by the one or more other onboard devices.

8. The vehicle according to claim 6, wherein the second information includes an operation request requesting the one or more other onboard devices to operate in a predetermined operation mode.

* * * * *